(12) United States Patent
Bucceri

(10) Patent No.: US 7,647,782 B2
(45) Date of Patent: Jan. 19, 2010

(54) FROZEN BEVERAGE AND ICE MAKING MACHINES

(76) Inventor: Alfio Bucceri, 14 Grays Road, Hamilton, QN (AU) 4007

( * ) Notice: Subject to any disclaimer, the term of this patent is extended or adjusted under 35 U.S.C. 154(b) by 258 days.

(21) Appl. No.: 11/792,497

(22) PCT Filed: Dec. 14, 2005

(86) PCT No.: PCT/AU2005/001895

§ 371 (c)(1),
(2), (4) Date: Jun. 6, 2007

(87) PCT Pub. No.: WO2006/063401

PCT Pub. Date: Jun. 22, 2006

(65) Prior Publication Data

US 2008/0127656 A1    Jun. 5, 2008

(30) Foreign Application Priority Data

Dec. 14, 2004   (AU) ............................. 2004907097
Jul. 15, 2005   (AU) ............................. 2005903741

(51) Int. Cl.
  *F25C 1/18*  (2006.01)
(52) U.S. Cl. .............................. 62/68; 62/317; 62/342; 62/457.3; 62/530

(58) Field of Classification Search ................... 62/68, 62/317, 342, 457.3, 530
See application file for complete search history.

(56) References Cited

U.S. PATENT DOCUMENTS

| | | |
|---|---|---|
| 1,771,186 A | 7/1930 | Mock |
| 3,715,895 A | 2/1973 | Devlin |
| 3,791,159 A * | 2/1974 | Devlin ............................ 62/68 |
| 4,452,302 A | 6/1984 | Schoerner |
| 4,485,636 A | 12/1984 | Hilado |
| 4,841,743 A * | 6/1989 | Brier ........................... 62/457.9 |
| 5,271,244 A | 12/1993 | Staggs |
| 5,363,660 A * | 11/1994 | Li et al. .......................... 62/71 |
| 5,704,222 A * | 1/1998 | Hage et al. ..................... 62/293 |
| 5,865,036 A | 2/1999 | Anthony |
| 6,863,916 B2 * | 3/2005 | Henriksen et al. ............ 426/524 |
| 2006/0010903 A1 * | 1/2006 | Porter ......................... 62/457.3 |

* cited by examiner

*Primary Examiner*—Cheryl J Tyler
*Assistant Examiner*—Jonathan Koagel
(74) *Attorney, Agent, or Firm*—Hudak, Shunk & Farine Co. LPA

(57) ABSTRACT

Apparatus (10) for converting liquid (60) in a container (50) to a semi-frozen slurry (61) or frozen ice particles, where a refrigerant (41) is contained within a refrigerant cavity (40) defined by two walls (20, 30), the flexing/deformation of at least one of the walls (20, 30) agitating the liquid (60) to assist the conversion thereof into the semi-frozen slurry (61) or ice particles.

14 Claims, 6 Drawing Sheets

FROZEN BEVERAGE AND ICE MAKING MACHINES

BACKGROUND OF THE INVENTION

1. Field of the Invention

THIS INVENTION relates to frozen beverage and ice making apparatus; and the methods for operation thereof.

The invention is particularly suitable for, but not limited to, apparatus for making frozen beverages in semi-frozen "slurry" or "slushie" form; and to an ice flake making apparatus as a toy or plaything, or for the production of ice flakes, e.g., for a display.

Throughout the specification, the term "slurry" shall be used to include a mixture of liquid/semi-liquid, liquid/frozen or semi-liquid/frozen portions of the liquid.

2. Prior Art

Machines to produce so-called "slushie"-type drinks, e.g., of well-known beverages such as "Coca-Cola", "Pepsi Cola" and "Schweppes Lemonade" (all Registered Trade Marks), are well-known and are commonly found at take-away food outlets and convenience stores. However, these machines are expensive to manufacture and install; and are not suitable for, e.g., domestic use, or the manufacture of a wide range of "slushie"-style beverages, including alcoholic beverages, such as cocktails.

Similarly, there is not a simple machine/apparatus for the manufacture of ice flakes (or snow flakes) for use by children as a game or plaything; or which can produce small volumes of such ice flakes, e.g., for display purposes.

SUMMARY OF THE INVENTION

It is an object of the present invention to provide an apparatus for making frozen beverages.

It is a preferred object of the present invention to provide an apparatus which can convert liquid beverages into a semi-frozen "slurry" or "slushie" form.

It is a further preferred object of the present invention to provide an apparatus, for use as a toy or plaything, for making ice particles such as ice flakes/ice granules/powdered ice.

It is a still further preferred object of the present invention to provide such an apparatus which is relatively inexpensive to manufacture and is easy to operate.

It is a still further preferred object of the present invention to provide an apparatus which is manufactured from food grade and/or safe materials.

It is a still further preferred object to provide methods for operating the apparatus.

Other preferred objects of the present invention will become apparent from the following description.

In one aspect, the present invention resides in an apparatus for converting a liquid into a semi-frozen or frozen form, including:

a first wall and a second wall sealably connected together to form a refrigerant cavity; and a refrigerant material at least partially filling the refrigerant cavity; wherein:

the refrigerant material is cooled below a freezing temperature of the liquid; and when the liquid is brought into contact with at least one of the walls, the liquid is at least partially frozen to form a semi-frozen slurry and/or frozen particles.

Preferably, the first wall and the second wall each have a respective side wall portion and respective bottom wall portion, where the first wall is enclosed by the second wall and is sealed thereto, either directly or indirectly, to form the refrigerant cavity therebetween.

Preferably, both the first and second wall are flexible; or one of the walls is flexible and the other wall is at least semi-rigid.

Preferably, the walls are formed of polymeric material, e.g., plastics such as polyurethane, thermoplastic polyurethane (TPU), PVC (polyvinyl chloride), latex or vinyl; rubber and/or metal, e.g., aluminium, foil; or a combination of two or more of these materials.

Preferably, the refrigerant material is a refrigerant fluid or cryogenic material. The refrigerant fluid may include brine (e.g., 80% water/20% salt (w/w)); water/sugar; brine/propylene glycol (food grade); Coca-Cola (Registered Trade Mark)/salt; diluted food grade calcium chloride; refrigerants such as R12, R22, R134 or other hydrocarbon refrigerant liquids; while the cryogenic material may include dry ice ($CO_2$), nitrogen or other suitable material.

Preferably, the refrigerant material can be cooled below the freezing point of the liquid, preferably, below $-12°$ C.; more preferably, below $-18°$ C.

An agitator or stirrer may be operably connected to at least one of the walls to cause agitation of the liquid in contact with the one of the walls and/or to cause release of the ice particles from the one of the walls.

Where the first wall forms a container to receive the liquid, the first wall may incorporate an extension portion movable between a first position to enable the liquid to be inserted into the container, or the semi-frozen slurry to be extracted from the container and a second position sealably closing the container, while the first wall is moved to agitate the liquid within the container.

To increase the cooling capacity of the apparatus, at least one cooling coil may be provided in the refrigerant cavity, or an adjacent cavity, and be operably connected to a source of refrigerated coolant.

In a second aspect, the present invention resides in a method of forming a semi-frozen slurry from a liquid, using the apparatus as hereinbefore described, wherein:

the first wall forms a container to receive the liquid;

the refrigerant material is cooled to a temperature below the freezing temperature of the liquid;

the liquid is placed in the container; and at least the first wall is deformed to agitate the liquid as the liquid is converted into the semi-frozen slurry.

In a third aspect, the present invention resides in a method of converting a liquid into a semi-frozen slurry, using the apparatus hereinbefore defined, wherein:

the refrigerant material is cooled to a temperature below the freezing temperature of the liquid;

the liquid is placed in a container;

at least a portion of the apparatus is inserted into the container to bring the second (or outer) wall into contact with the liquid;

the second wall is deformed as the liquid is converted into semi-frozen slurry; and the apparatus is withdrawn from the container.

The liquid may be a non-alcoholic beverage (such as a carbonated soft drink or a cordial); or an alcoholic beverage (such as a cocktail).

In a fourth aspect, the present invention resides in a method of converting a liquid into ice particles, using the apparatus as hereinbefore described, including the steps of:

freezing the refrigerant material below the freezing point of the liquid;

applying the liquid to the second wall to freeze the liquid into ice particles; and deforming the second (or outer) wall to release the ice particles from the second (or outer) wall.

The liquid may be applied to the second (or outer) wall in a mist or spray form, e.g., by one or more spray nozzles; and one or more fans may blow air over the second wall, as the second wall is being deformed, to cause the ice particles to fall as ice flakes in a shower-like pattern.

Other preferred forms of the invention will be hereinafter described.

BRIEF DESCRIPTION OF THE DRAWINGS

To enable the invention to be fully understood, preferred embodiments will now be described with reference to the accompanying drawings, in which.

DETAILED DESCRIPTION OF THE PREFERRED EMBODIMENTS

Figures 1, 2, 3:
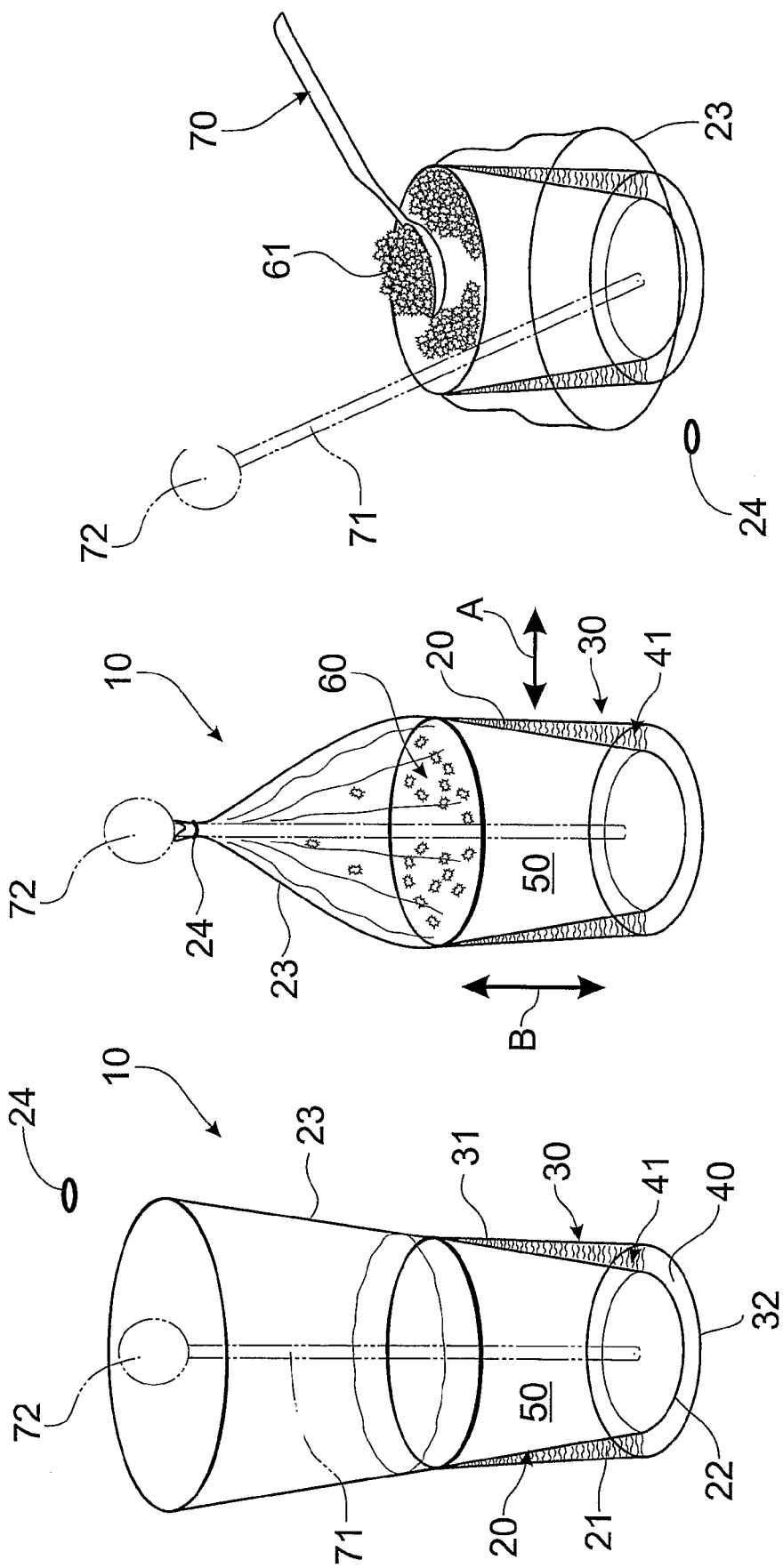
FIGS. 1 and 2 are schematic perspective views of a first embodiment of the present invention to convert a liquid (e.g., beverage) into a semi-frozen slurry or "slushie"
FIG. 3 is a similar view showing the semi-frozen slurry being removed from the apparatus using a spoon.

Referring to the first embodiment of FIGS. 1 to 3, the apparatus 10 is designed to convert a liquid beverage, e.g., a carbonated soft drink such as "Coca-Cola" or "Pepsi Cola" (Registered Trade Marks) into a semi-frozen slurry.

The apparatus 10 has a first (or inner) wall 20 and a second (or outer) wall 30, both formed of TPU. The walls 20, 30 respectively have side wall portions 21, 31 and bottom wall portions 22, 32, the upper ends of the side wall portions 21, 31 are sealed, e.g., by RF welding, and the walls 20, 30 define a refrigerant cavity 40 which contains a refrigerant material, e.g., a brine or brine/propylene glycol mixture 41.

The first wall 20 has an extension portion 23 which is movable between a first position, shown in FIG. 1, to form a "funnel-like" extension to a container 50 formed by the first wall 20. As shown in FIG. 2, after the liquid to be frozen has been poured into the container 50, the extension portion 23 can be moved to a second position and sealably closed by a rubber O-ring 24 to prevent release of the liquid 60 from the apparatus 10.

Before the apparatus is used to convert the liquid beverage 60 into the semi-frozen-slurry 61, the apparatus 10 is placed in a freezer until the refrigerant material 41 has been cooled below the freezing temperature of the liquid 60. Preferably, the refrigerant material is cooled below −12° C., or more preferably below −18° C.

After the refrigerant material 41 has been cooled, the liquid 60 has been poured into the container 50 and the extension portion 23 closed by the rubber ring 24, the apparatus 10 may be agitated by squeezing the walls 20, 30 in and out, as shown by arrow A, and/or by shaking the apparatus as shown by arrow B.

When the liquid 60 has been converted to the semi-frozen slurry 61, as shown in FIG. 3, the rubber ring 24 is removed and the extension portion 23 folded back to enable the semi-frozen slurry 61 to be extracted from the apparatus, e.g., by a spoon 70.

In an alternative embodiment, a stirring rod 71, with a knob 72 may be set in the container 50 to stir/agitate the liquid 60.

In an alternative embodiment, the lower end of the rod 71 may be attached to the bottom wall portion 22 of the first wall 20, to move the bottom wall portion 22 up and down, i.e., in the direction of arrow B, to assist in the agitation of the liquid 60 in the container 50.

When the semi-frozen slurry 61 has been consumed, the apparatus 10 may be disposed of. Alternatively, the apparatus 10 may be washed and returned to the freezer for re-use.

An insulating holder, not shown, may be placed around the second wall 30 to insulate the apparatus 10 from the user's hand(s) as the liquid 60 is converted to the semi-frozen slurry 61 and the slurry 61 is then consumed.

If preferred, the second wall 30 may be formed of rigid or semi-rigid material to assist in holding the apparatus, where the stirring rod 71 is provided to deform the first wall 20 to agitate the liquid 60.

Figure 4:
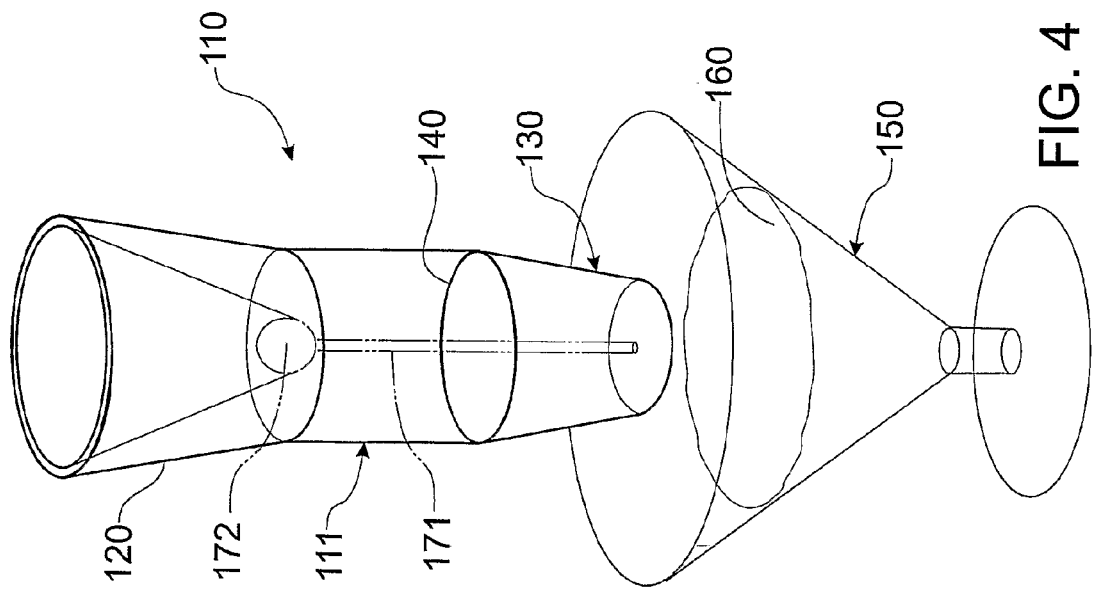

Referring to the second embodiment of FIGS. 3 and 4, the apparatus 110 is used to convert, e.g., an alcoholic cocktail 160 (such as a Margarita) contained in a glass 150 into a semi-frozen slurry 161. The apparatus 110 has a body 111, preferably formed of semi-rigid plastic, where a first wall 120 is engaged by, or connected to, the knob 172 on an agitator rod 171. The first wall 120 is movable from the "inverted" configuration shown in FIG. 4 to the extended configuration shown in FIG. 5. The second wall 130, at the opposite end of the body 111, is operably connected to the other end of the agitator rod 171 and is movable from the extended configuration shown in FIG. 4 to the inverted configuration shown in FIG. 5. The walls 120, 130 and body 111 define the refrigerant cavity 140 which contains a suitable refrigerant material.

In use, the apparatus 110 is placed in a freezer until the refrigerant material is cooled below the freezing temperature of the liquid (cocktail) 160.

The agitator rod 171 is moved downwardly, as shown in FIG. 4, and the second wall 130 is inserted into the liquid cocktail 160, contained within the glass 150.

Figure 5:
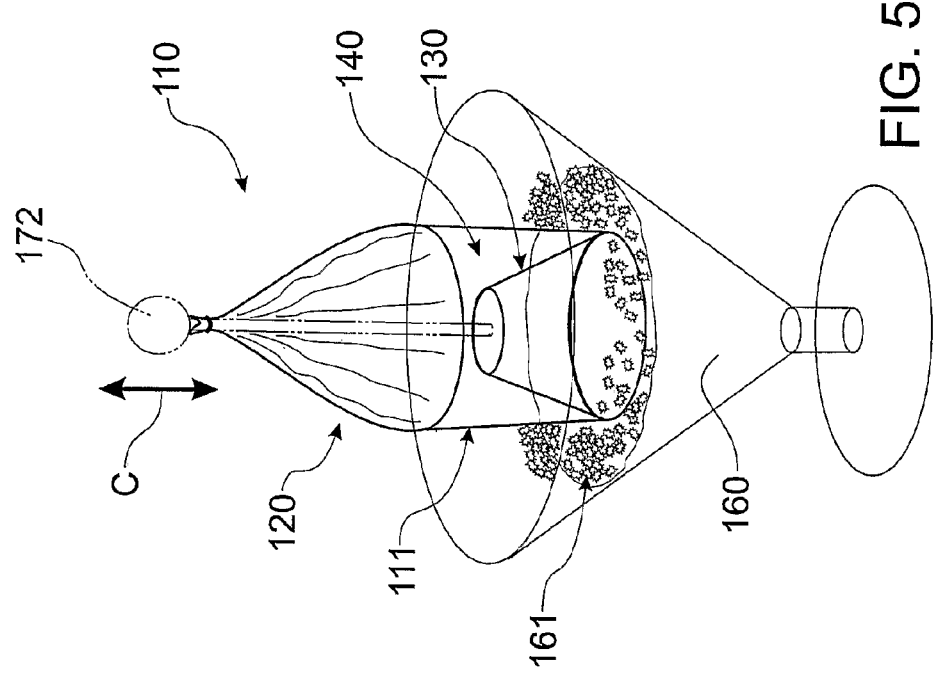
FIGS. 4 and 5 are schematic perspective views of a second embodiment of the present invention where the apparatus is used to convert liquid, e.g., cocktail, into a semi-frozen slurry.

By moving the agitator rod 171, via the knob 172, in the direction of the arrow C in FIG. 5, the second wall 130 agitates the liquid cocktail 160 as the refrigerant material cools the liquid cocktail 160 and the semi-frozen slurry 161 is produced. When the liquid cocktail 160 has been converted to the semi-frozen slurry condition, the apparatus 110 is withdrawn and the semi-frozen slurry 161 can then be consumed.

Figure 6:
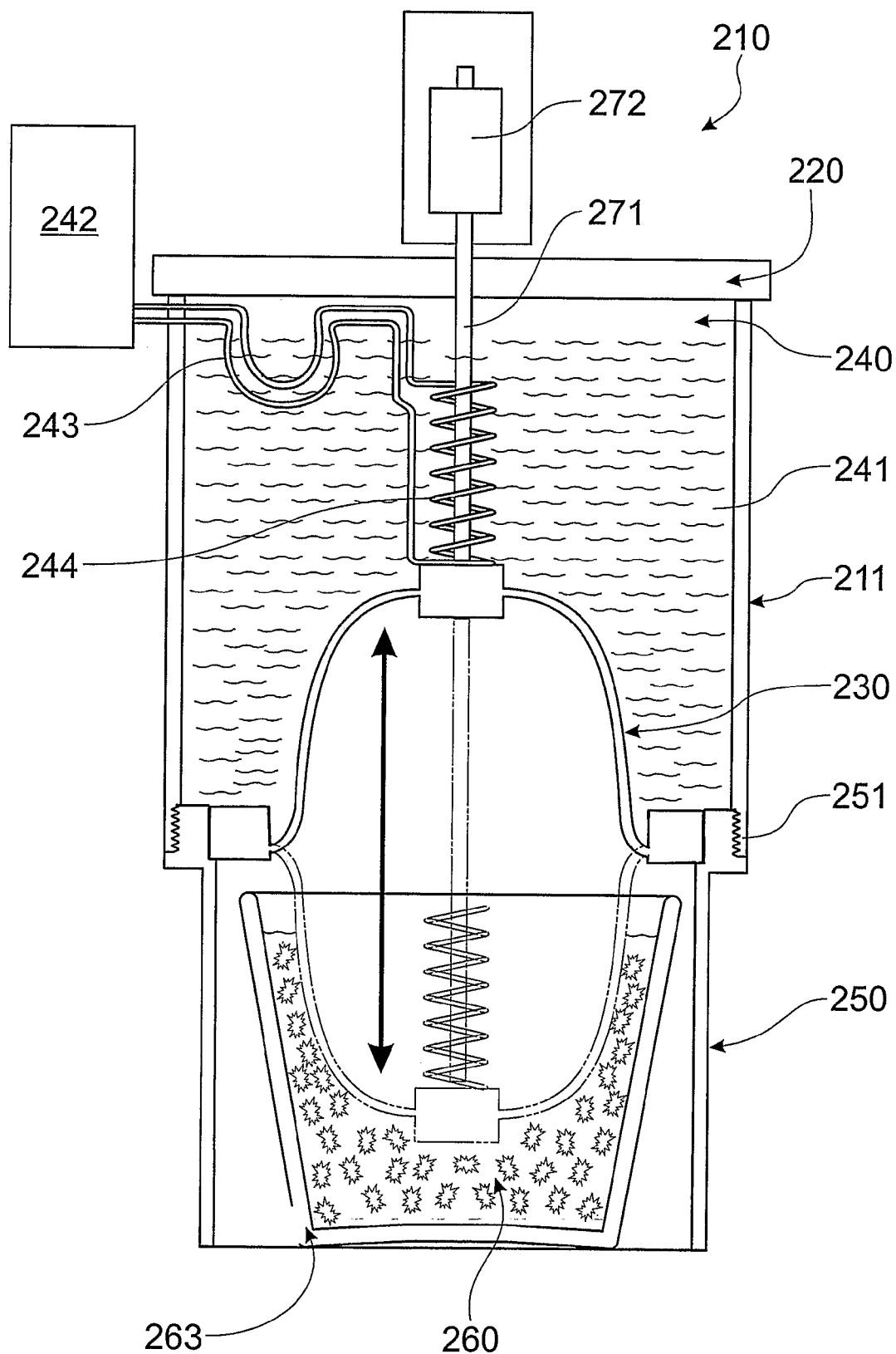
FIG. 6 is a schematic side view of a third embodiment suitable for use in a bar for making frozen cocktails.

The apparatus 210 of the third preferred embodiment—see FIG. 6—is designed to convert liquid cocktails 260, contained in glasses or mixing containers 263 at a higher production rate, e.g., suitable for use in cocktail bars.

The apparatus 210 has a body 211 closed by a top wall 220 and a flexible lower wall 230 (e.g., of TPU material) where a rim or flange 212 is releasably, e.g., screw-threadably, engaged with the mouth 251 of a base container 250.

When the body 211 is released from the base container 250, a glass 263, with a liquid beverage 260 (e.g., an alcoholic cocktail) is placed in the base container 250 and the body 211 is reconnected.

Suitable refrigerant material, or cryogen material such as dry ice, 241 is contained within the refrigerant cavity 240 and may be maintained at a temperature below the freezing temperature of the liquid 260 by passing a coolant, from a coolant source 242, through flexible coolant lines 243, to a cooling coil 244 within the refrigerant cavity 240.

The bottom wall 230 is connected to an agitating rod 271, driven by an agitator drive 272 (e.g., a pneumatic piston or retro-magnetic motor) to deform the bottom wall 230 to engage and agitate the liquid 260 contained in the glass 263 placed the base container 250.

This machine is particularly suitable for use in bars. The screw-threaded engagement between the body 211 and the base container 250 can alternatively be effected by a complementary tapered coupling, or a mechanical coupling, e.g., of the bayonet type.

Figure 8:
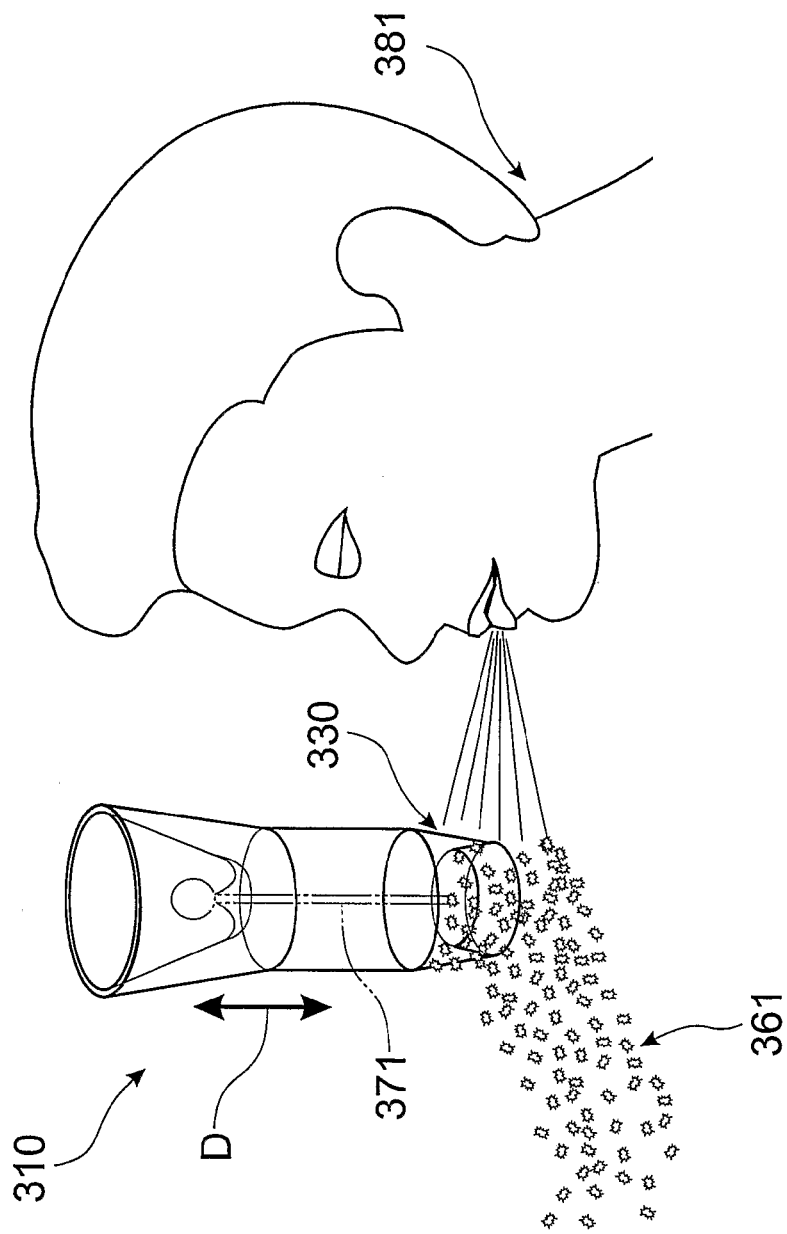
FIGS. 7 and 8 are schematic perspective views of a fourth embodiment of the invention for use as a toy or plaything, for making ice flakes.
Figure 7:
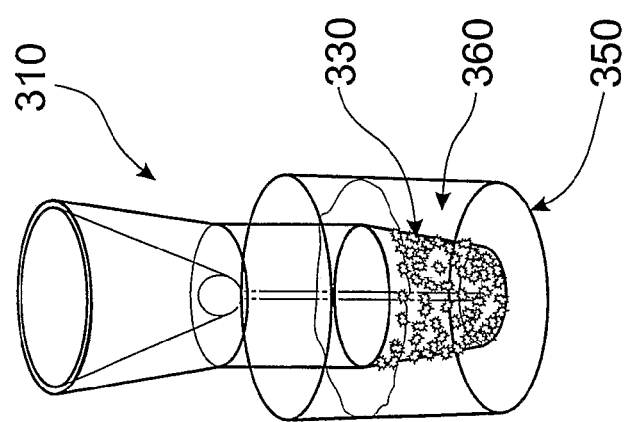
Figure 9:
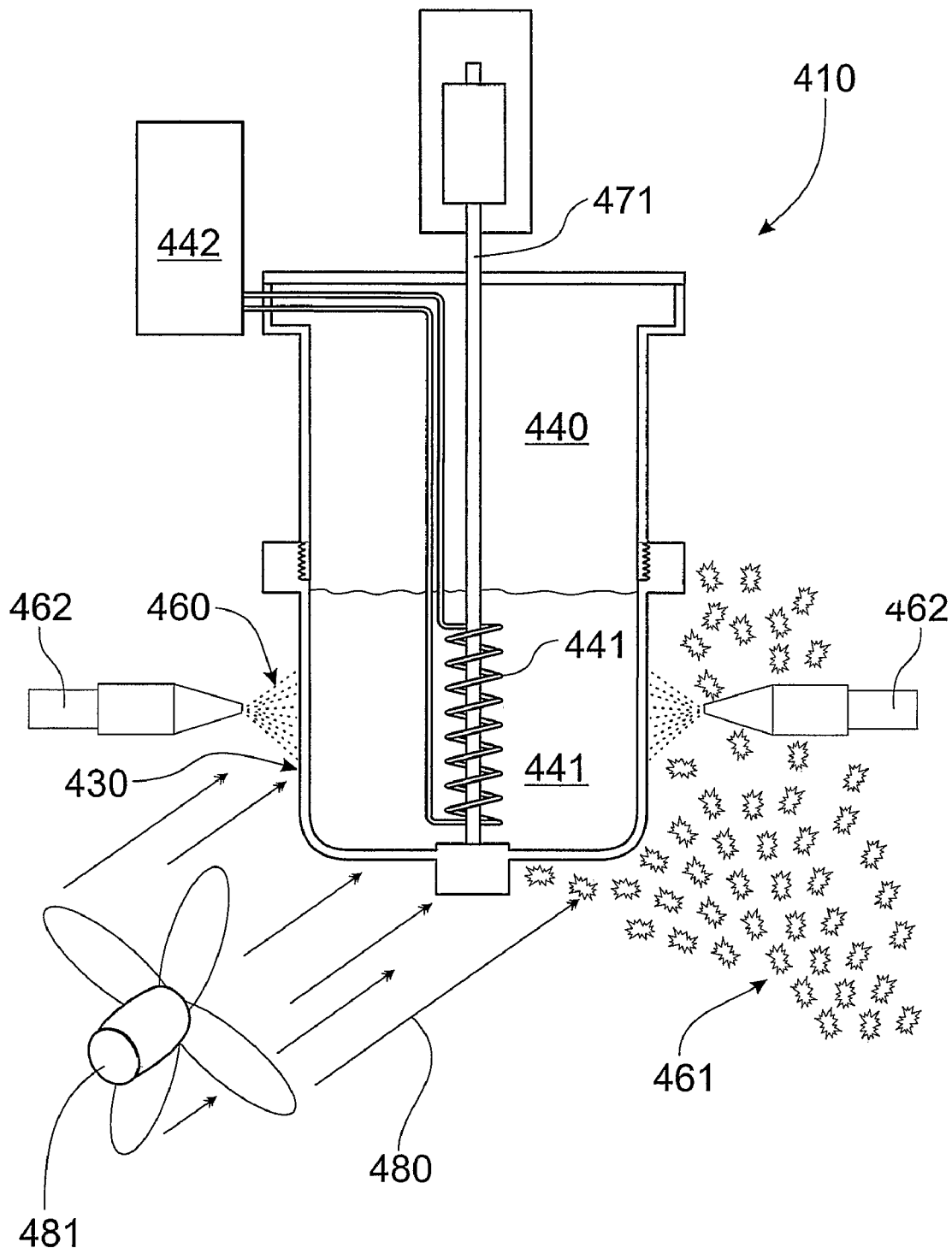
FIG. 9 is a schematic sectional side view of a fifth embodiment of the invention for making a large volume of ice flakes.

The fourth embodiment of FIGS. 7 and 8 shows a toy or plaything operable to form ice particles such as ice flakes. The apparatus 310 is arranged substantially as for the apparatus 110 of the second embodiment, where the lower wall 330 is briefly dipped into liquid 360 within a container 350, after the refrigerant material has been cooled below the freezing temperature of the liquid 360. When the apparatus 310 is raised, the agitating rod 371 can be moved in the direction of arrow D to cause the lower wall 330 to flex or deform, to dislodge the ice particles 361 from the apparatus 310 in the form of a fine shower of ice flakes. The child 381 can blow onto the apparatus to assist in dislodging the ice particles 361.

Where a larger volume of ice-like particles is required, e.g., for a display, the apparatus 410 of the fifth embodiment of FIG. 9 may be employed, where the apparatus is substantially identical to the apparatus 210 of the third embodiment.

Fine, misty liquid (e.g., water) 460 is sprayed (via nozzles 462) onto the flexible bottom/side wall 430, which is cooled by the refrigerant material 441 in the refrigerant cavity 441, the cooling being assisted by coolant pumped through the cooling coil 444 from a coolant refrigerated source 442. The spray of liquid 460 is interrupted and the agitator rod 471 is operated to flex or deform the bottom wall 460 to cause the release of the ice particles 461, the release being assisted by the air flow 480, directed towards the apparatus 410, by one or more fans 481. When a batch of ice particles 461 has been released, a further volume of liquid 430 is sprayed onto the bottom/side wall 430 and the cycle is repeated.

Figure 10:
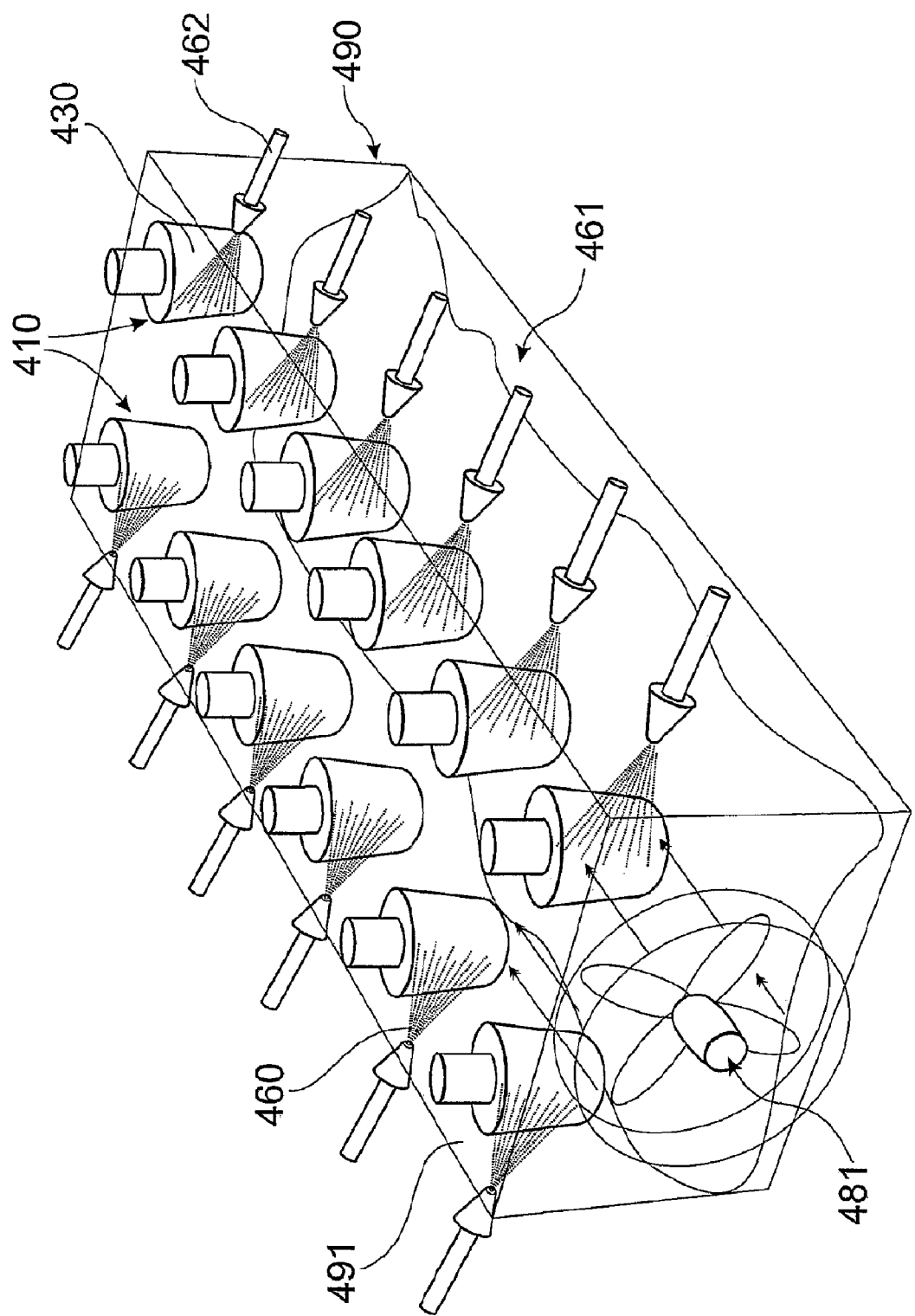
FIG. 10 is a schematic perspective view of an insulated container provided with a plurality of the ice flake machines.

As shown in FIG. 10, a plurality of the apparatus 410 of FIG. 9 may be placed within an insulated container 490, e.g., suspended from the roof or top cover 491, and each provided with one or more liquid sprays 462.

At least one fan 481 provides the air flow through the container 490, and the ice flakes 461 collect in the bottom of the container 490 for future use.

The container 490 could be a room, where the ice flakes 461 create the effect of falling snow.

It will be readily apparent to the skilled addressee that the embodiments of the present invention have a wide range of potential applications for converting different liquids into semi-frozen slurries and/or frozen ice particles.

By the selection of suitable food grade materials for the apparatus, and consumable liquids to be frozen, the apparatus can produce a wide range of edible/consumable semi-frozen slurries or frozen ice particles.

Various changes and modifications may be made to the embodiments described and illustrated without departing from the present invention.

The invention claimed is:

1. A method of converting a liquid into ice particles, using an apparatus including a first wall and a second wall sealably connected together to form a refrigerant cavity;

a refrigerant material at least partially filling the refrigerant cavity;

when the liquid is brought into contact with at least one of the walls, the liquid is at least partially frozen to form a semi-frozen slurry or frozen particles, or a combination thereof, including the steps of:

cooling the refrigerant material below a freezing point of the liquid;

applying the liquid to the second wall to freeze the liquid into ice particles; and deforming the second wall to release the ice particles from the second wall.

2. The method according to claim 1, wherein the liquid is applied to the second wall in a mist or spray form, such as by one or more spray nozzles; and one or more fans blow air over the second wall, as the second wall is being deformed, to cause the ice particles to fall as ice flakes in a shower-like pattern.

3. The method according to claim 1, wherein the walls include polyurethane, thermoplastic polyurethane, polyvinyl chloride, latex, vinyl, aluminum or foil, or a combination thereof.

4. The method according to claim 1, wherein the liquid includes a carbonated soft drink, a cordial, or a cocktail.

5. The method according to claim 1, wherein the liquid is a non-alcoholic beverage or an alcoholic beverage.

6. The method according to claim 1, wherein the first wall and the second wall each have a respective side wall portion and respective bottom wall portion, where the first wall is enclosed by the second wall and is sealed thereto, either directly or indirectly, to form the refrigerant cavity therebetween.

7. The method according to claim 6, wherein both the first and second wall are flexible; or one of the walls is flexible and the other wall is at least semi-rigid.

8. The method according to claim 7, wherein the walls are formed of polymeric material, rubber, or metal, or a combination thereof.

9. The method according to claim 1, wherein the refrigerant material is a refrigerant fluid or cryogenic material, and the refrigerant fluid includes brine; water/sugar; brine/propylene glycol (food grade); diluted food grade calcium chloride; a refrigerant or other hydrocarbon refrigerant liquid; and the cryogenic material includes dry ice ($CO_2$), nitrogen or other suitable material.

10. The method according to claim 1, wherein the refrigerant material is cooled at least to below −12° C.

11. The method according to claim 1, wherein an agitator or stirrer is operably connected to at least one of the walls to cause agitation of the liquid in contact with one of the walls or to cause release of the ice particles from one of the walls, or a combination thereof.

12. The method according to claim 1, wherein the first wall forms a container to receive the liquid; and the first wall further incorporates an extension portion movable between a first position to enable the liquid to be inserted into the container, or the semi-frozen slurry to be extracted from the container, and a second position sealably closing the container, while the first wall is moved to agitate the liquid within the container.

13. The method according to claim 1, wherein to increase the cooling capacity of the apparatus, at least one cooling coil is provided in the refrigerant cavity, or an adjacent cavity, and is operably connected to a source of refrigerated coolant.

14. The method according to claim 9, wherein the refrigerant is R12, R22 or R134.

* * * * *